July 18, 1961
H. M. SCHATZMAN
2,992,850
BURGLAR-PROOF GRILLE FOR AUTOMOBILE DOOR WINDOWS
Filed Dec. 2, 1959
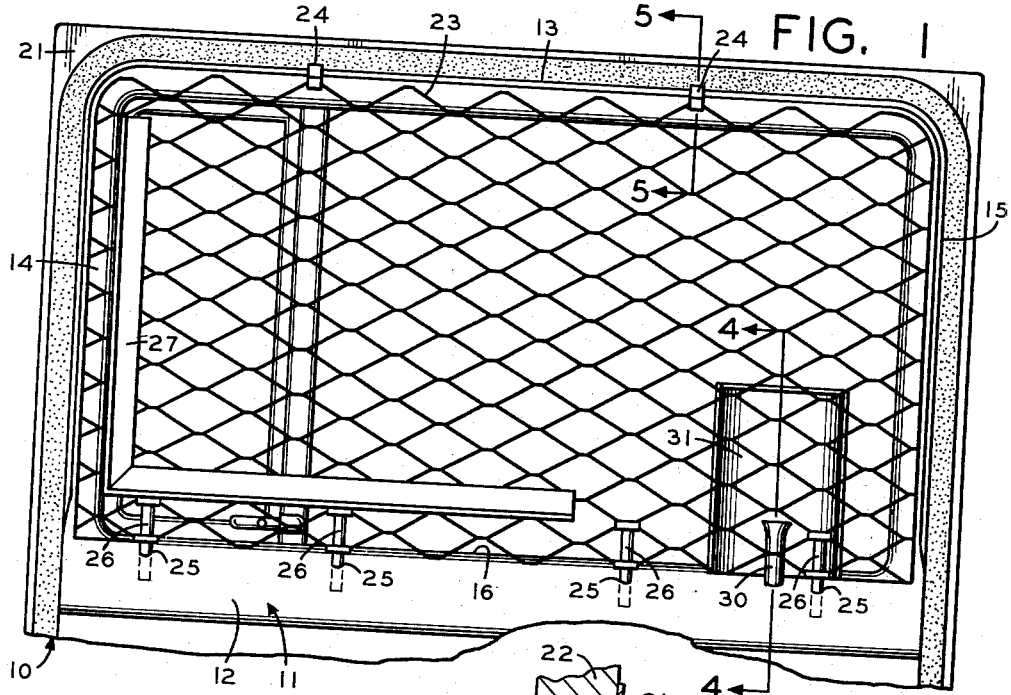
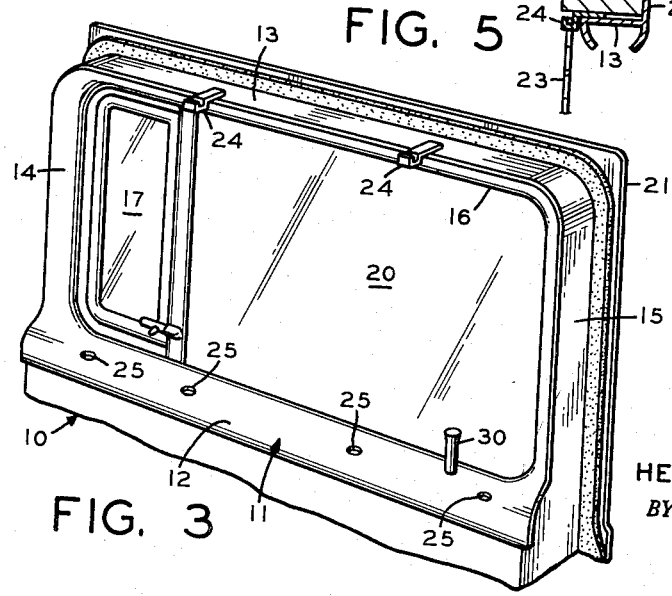
INVENTOR.
HERMAN M. SCHATZMAN
BY Cohn and Powell
ATTORNEY

United States Patent Office 2,992,850
Patented July 18, 1961

2,992,850
BURGLAR-PROOF GRILLE FOR AUTOMOBILE DOOR WINDOWS
Herman M. Schatzman, 7241 Amherst Ave., University City, Mo.
Filed Dec. 2, 1959, Ser. No. 856,848
5 Claims. (Cl. 296—44)

This invention relates generally to a burgular-proof assembly for an automobile, and more particularly to an improved protective grille and means for attaching such grille to prevent forcible entry through a door window.

In order to gain access to the interior of a closed, locked automobile for the purpose of either stealing the automobile or personal property and equipment located within the automobile, thieves and burglars will usually smash a door window, reach through the window and then unlock the door from the inside. Present statistics show that 99% of break-ins into automobiles are accomplished in this manner. It is a major objective of the present invention to provide a protective grille that can be quickly and easily attached of the inside of the door to cover the window and hence preclude access even though the glass be lowered or broken.

An important object is achieved by the provision of fastening means on the door adapted readily to cooperate with and connect the grille in position over the window when the door is open, and in addition, to permit selectic detachment of the grille when its use is not required or desired.

Another important object is realized by the quick connect-disconnect feature of the grille and door frame which enables the grille to be placed quickly and easily in protective relation on the door when desired, yet permits ready removal for normal automobile appearance and usage, in that the grille can be advantageously stored in the trunk or elsewhere in the automobile until the need for more complete theft preventive measures arise.

Yet another important object is achieved by a grille having a plurality of pins that detachably interfit apertures formed in the bottom of the window frame on the inside of the door, and by hooks attached to the top of the frame in which the grille seats, such structural arrangement realizing the fast connect-disconnect feature discussed previously.

Still another important objective is realized by placing the hooks on the window frame in a location so that a portion of the automobile body frame surrounding the door overlies the hooks to prevent removal of the grille from the hooks when the door is closed.

Other important advantages are realized in that the grille pins extend into the window frame apertures for a distance greater than the distance the grille can be moved in the hooks until abutment with the body frame portion when the door is closed so as to preclude removal of the pins from the door, and hence to preclude access to the interior of the automobile through the window.

An important object is to provide a grille that can be attached or detached only when the door is open, but cannot be removed from its protective position over the window when the door is closed.

Another important object is achieved by the provision of a shield on the grille which extends substantially about a door lock plunger, conventionally utilized on present automobiles, in order to prevent anyone from manipulating the plunger from the outside through the window even though the glass be open or broken. The shield is disposed between the plunger and the outside of the door.

For convenience, the plunger guarding shield is open toward the inside of the door to enable normal operation from the interior of the automobile.

Another important object is to provide a burglar-proof grille assembly that is simple and durable in construction, economical to manufacture, efficient in operation, and which can be installed and used by anyone with only a minimum of instruction.

The foregoing and numerous other objects and advantages of the invention will more clearly appear from the following detailed description of a preferred embodiment, particularly when considered in connection with the accompanying drawing, in which:

FIG. 1 is a side elevational view of the burglar-proof grille mounted on an automobile door as seen from the inside of such door;

FIG. 2 is a top plan view of the grille shown in FIG. 1;

FIG. 3 is a perspective view of the automobile door showing the mounting means for the grille on the inside of the door;

FIG. 4 is a fragmentary, cross-sectional view as seen along line 4—4 of FIG. 1, and FIG. 5 is a fragmentary, cross-sectional view of the top portion of the door and body frame.

Referring now by characters of reference to the drawing, and first to FIGS. 1 and 3, it is seen that the burglar-proof protective assembly utilizes the automobile door generally referred to at 10 which may be of the usual construction. The automobile door 10 includes a glass frame referred to at 11, of a generally rectangular configuration. The glass frame 11 consists of a lower frame ledge portion 12, an upper cross frame portion 13 and integrally connected, spaced side frame portions 14 and 15.

As is usual, the glass frame 11 defines a window generally indicated at 16. In the majority of present automobiles, the window 16 of the front door usually includes a hinged side vent 17 at its forward end and a roll-up glass panel 20 covering the remaining rear portion.

The automobile door includes a peripheral flange 21 that seats against the body frame of the automobile to provide a seal when the door is closed. It will be noted that the upper body frame portion 22 closely overlies the glass cross frame portion 13, as is illustrated more clearly in FIG. 5, the purpose and function of which will be later described in detail.

The protective assembly includes a grille or screen 23 made of heavy wire mesh. The grille 23 is of a size to fit over and cover the entire window 16 from the inside of the door, as is best illustrated in FIG. 1. In the preferred structure, the peripheral margins of grille 23 overlap to some extent and engage the glass frame 11.

Attached to the upper glass cross frame portion 13 are a pair of hooks 24 that extend inwardly and face upwardly. From FIG. 5, it is seen that the hooks 24 are overlapped by the peripheral body frame portion 22 when the door is closed.

Formed on the inside of the glass frame ledge 12 are a plurality of spaced apertures 25 constituting sockets. The apertures 25 are arranged in a straight row.

A plurality of pins 26 are fixedly secured to the grille 23 and extend downwardly below the lower grille margin. The pins 26 are spaced so as to interfit the apertures 25 when the grille 23 is assembled on the automobile door.

To assemble the grille 23, the automobile door 10 is opened. Then, the grille 23 is fitted over the window 16 by placing the pins 26 into the apertures 25 and then lowering the upper margin of the grille 23 into the hooks 24. When the door 10 is closed, the upper body frame portion 22 overlaps the open faced hooks 24 and the upper margin of the grille 23 to prevent removal of the grille 23 from such hooks 24. It is seen that the grille 23 is now securely locked in position.

If a thief smashes either the glass vent 17 or glass panel 20 in an attempt to gain access to the interior of the automobile, such thief will be stopped by grille 23. The grille 23 cannot be shoved inwardly or sideways out of place because of the connection of the hooks 24 and the pins 26. Moreover, the grille 23 cannot be lifted to remove the upper margin of the grille from the hooks 24 because the upper grille margin abuts the body frame portion 22 to prevent such removal. In addition, the pins 26 are of sufficient length so that they do not disengage from the apertures 25 before abutment of the upper grille margin with the body frame portion 22. Thus it is seen that the grille 23 remains tightly secured in protective position over the window 16 when the door 10 is closed.

A right angle brace 27 is secured to the mesh of grille 23 to provide rigid reinforcement in that area depthwise aligned with the side vent 17. Because the side vent 17 is frequently broken or forced by a thief attempting to gain entrance, the brace 27 prevents the mesh of the grille 23 from being bulged or otherwise deformed.

Of course, the grille 23 can be quickly and easily removed when desired. First, the automobile door 10 is opened. Then, the grille 23 is lifted to remove the upper grille margin from the hooks 24 and then the pins 26 are lifted out of the glass frame apertures 25. The grille 23 can then be stored in the trunk or in the automobile interior until the need for theft preventive measures arise again.

It is apparent that the burglar-proof grille 23 can be attached and detached only when the automobile door 10 is open and cannot be removed when the door 10 is closed.

In some automobiles, a door lock plunger 30 extends upwardly through the glass frame ledge 12 on the inside of the door. To prevent a thief from reaching through the window 16, either when the glass 20 is broken or open, to manipulate the plunger 30 in order to open the automobile door 10, a protective imperforate shield 31 is provided on the grille 23.

The sides of shield 31 are attached to the mesh of the grille 23 and its intermediate portion extends around the plunger 30. The shield 31 extends from the lower grille margin closely adjacent to the glass frame ledge 12 upwardly for a considerable distance above the plunger 30. In being disposed between the plunger 30 and the outside of the automobile door 10, the plunger 30 cannot be reached through the window 16 when the door is closed. However, the shield 31 is open along the side facing the automobile interior so that the operator can easily manipulate the plunger 30 from inside the automobile for normal locking and unlocking operation of the door. Of course, the shield 31 is located on the grille 23 so that it fits over and covers the plunger 30 automatically upon connection of the pins 26 and the glass frame apertures 25 and upon connection of the upper grille margin in the hooks 24. The plunger 30 extends upwardly through the open bottom end of the shield 31.

A grille 23 of the construction disclosed can be conveniently and advantageously utilized on any automobile door. The item is one which can be manufactured and sold as an accessory with instructions for installation by the purchaser or by the dealer of the item. The grille 23 is of a particular shape and configuration conforming with the window size of a specific make and year of automobile. The installer first attaches the hooks 24 to the upper glass cross frame portion 13 either by welding, by screws or other suitable means. Then the installer drills a number of apertures 25, a total of four in the embodiment disclosed, in alignment to receive the grille pins 26. After performing these simple opera-tions, the door is now adapted to receive and retain the protective burglar-proof grille 23.

When the operator desires to attach the grille 23, the door 10 is opened and the pins 26 of the grille are located in apertures 25. As the pins 26 are lowered into the apertures 25, the upper grille margin is lowered into the hooks 24. In automobiles utilizing the plunger 30, the shield 31 attached to the grille 23 lowers automatically over the plunger 30 between the plunger 30 and the outside of the door. When the door 10 is closed, the grille 23 is securely locked in protective position as explained previously. The grille 23 cannot be removed either from the inside or the outside when the door 10 is closed. A thief cannot gain access through the window 16 because of the closure provided by the grille 23 and cannot manipulate plunger 30 to unlock the door 10 because of the enclosure provided by shield 31.

The burglar-proof grille 23 can easily be removed by the operator by opening the door and then by simply lifting the upper grille margin from the hooks 24 and lifting the grille pins 26 from the glass frame ledge apertures 25.

Although the invention has been described by making detailed reference to a preferred embodiment, such detail is to be understood as an instructive, rather than in any restrictive sense, many variants being possible within the scope of the claims hereunto appended.

I claim as my invention:

1. A protective grille for an automobile door window comprising a screen adapted to fit over the window, means on the top of said screen adapted to connect with fastening means on the door, a plurality of pins attached to the bottom of said screen and extending therebelow, and an imperforate housing attached to said screen and extending upwardly from its lower margin, said housing providing a cup closed on the inside by said screen and open only at its bottom, said housing being adapted to receive a door lock plunger through its open bottom and to extend between the door lock plunger and the outside of the door.

2. In a burglar-proof assembly, an automobile door including a glass frame defining a window, hook means attached to said frame at one side of said window on the inside of said door, means on said frame at the opposite side of said window providing a plurality of sockets, a grille, a plurality of pins attached to one side of said grille, said pins seating in said sockets, and said grille seating in said hook means, said grille extending over said window, a door lock plunger extending through the glass frame on the inside of the door, and a shield attached to said grille and disposed about said plunger to cover the plunger to prevent access to the plunger through said window.

3. In a burglar-proof assembly, an automobile door inluding a glass frame defining a window, hook means attached to said frame at one side of said window on the inside of said door, means on said frame at the opposite side of said window providing a plurality of sockets, a grille, a plurality of pins attached to one side of said grille, said pins detachably interfitting said sockets and said grille detachably seating in said hook means, said grille extending over said window, a body frame portion overlapping the side of the grille seated in said hook means when the door is cloesd to prevent removal from said hook means, a door lock plunger extending through the said glass frame on the inside of the door, and a shield attached to said grille, said shield being disposed between the plunger and the outside of the door, said shield covering said plunger to preclude access to the plunger through the window.

4. In a burglar-proof assembly for an automobile, a door including a glass frame defining a window, a grille detachably connected to the inside of the door and covering said window, a door lock plunger extending through the glass frame on the inside of said door, and a shield having side portions attached to said grille and having an intermediate portion extending between the plunger and the outside of the door, the shield covering plunger to preclude access to the plunger through the window.

5. In a burglar-proof assembly for an automobile, a hinged door including a glass frame defining a window, upwardly facing hooks fastened to the inside of the door at the top of the window, means on the inside of the door providing a plurality of sockets at the bottom of the window, a grille seated in said hooks, a plurality of pins attached to said grille and detachably interfitted in said sockets, the grille covering the inside of said window, a body frame about said door, said body frame including a portion overlying the upwardly facing hooks and said grille when the door is closed, the said pins extending into the sockets a distance greater than the distance the grille can move upwardly before engaging the body frame portion when the door is closed so as to preclude detachment of the pins from the door, a door lock plunger extending through the glass frame on the inside of the door, and a shield having side portions attached to said grille and having an intermediate portion extending between the plunger and the outside of the door, the shield covering the plunger to preclude access to the plunger through the window.

References Cited in the file of this patent

UNITED STATES PATENTS

| | | |
|---|---|---|
| 1,697,092 | Spreiter | Jan. 1, 1929 |
| 1,753,795 | Linn | Apr. 8, 1930 |
| 2,223,477 | Bernier | Dec. 3, 1940 |
| 2,864,648 | Bland | Dec. 16, 1958 |